United States Patent [19]

Konieczka

[11] Patent Number: 4,503,739

[45] Date of Patent: Mar. 12, 1985

[54] TABLE SAW WITH MULTIPLE BLADE TURRET

[76] Inventor: Edmund T. Konieczka, 520 Grove Ave., Wisconsin Rapids, Wis. 54494

[21] Appl. No.: 614,399

[22] Filed: May 25, 1984

Related U.S. Application Data

[63] Continuation of Ser. No. 341,934, Jan. 22, 1982.

[51] Int. Cl.³ .................. B23D 19/04; B26D 1/18; B27C 9/04
[52] U.S. Cl. .................. 83/471.1; 83/479; 144/1 R
[58] Field of Search .............. 83/471.1, 549, 490, 83/479; 144/1 R, 2 R, 286 R

[56] References Cited

U.S. PATENT DOCUMENTS

| | | | |
|---|---|---|---|
| 315,513 | 4/1885 | Kidder | 83/471.1 |
| 386,806 | 7/1888 | Farwell | 83/471.1 |
| 910,562 | 1/1909 | Meyers | 83/471.1 |
| 1,139,659 | 5/1915 | Fox et al. | 83/471.1 |
| 1,455,426 | 5/1923 | Charles | 83/490 |
| 1,988,243 | 1/1935 | Johnson | 83/471.1 |
| 2,393,585 | 1/1946 | Bruker | 83/479 |
| 2,518,684 | 8/1950 | Harris | 83/471.1 |
| 4,215,609 | 8/1980 | Coburn et al. | 83/549 |

FOREIGN PATENT DOCUMENTS 300313  3/1972  U.S.S.R. .................. 83/479

*Primary Examiner*—Paul A. Bell
*Assistant Examiner*—Paul M. Heyrana, Sr.
*Attorney, Agent, or Firm*—Fuller, House & Hohenfeldt

[57] ABSTRACT

Rotary power saw having plural saw wheels mounted on a turret and means to rotate the turret for presenting a particular saw wheel for sawing. A single drive means is provided, and means are provided for engaging it with a selected saw wheel for sawing, and disengaging it for changing the saw wheel selected for sawing. Thus, only the selected blade is driven, and only a single motor need be provided, yet the saw wheel can be changed easily and without tools.

In the preferred embodiment of the invention means are also provided for raising, lowering and tilting a selected saw wheel, so the present saw is as versatile as earlier saws having only a single blade.

8 Claims, 5 Drawing Figures

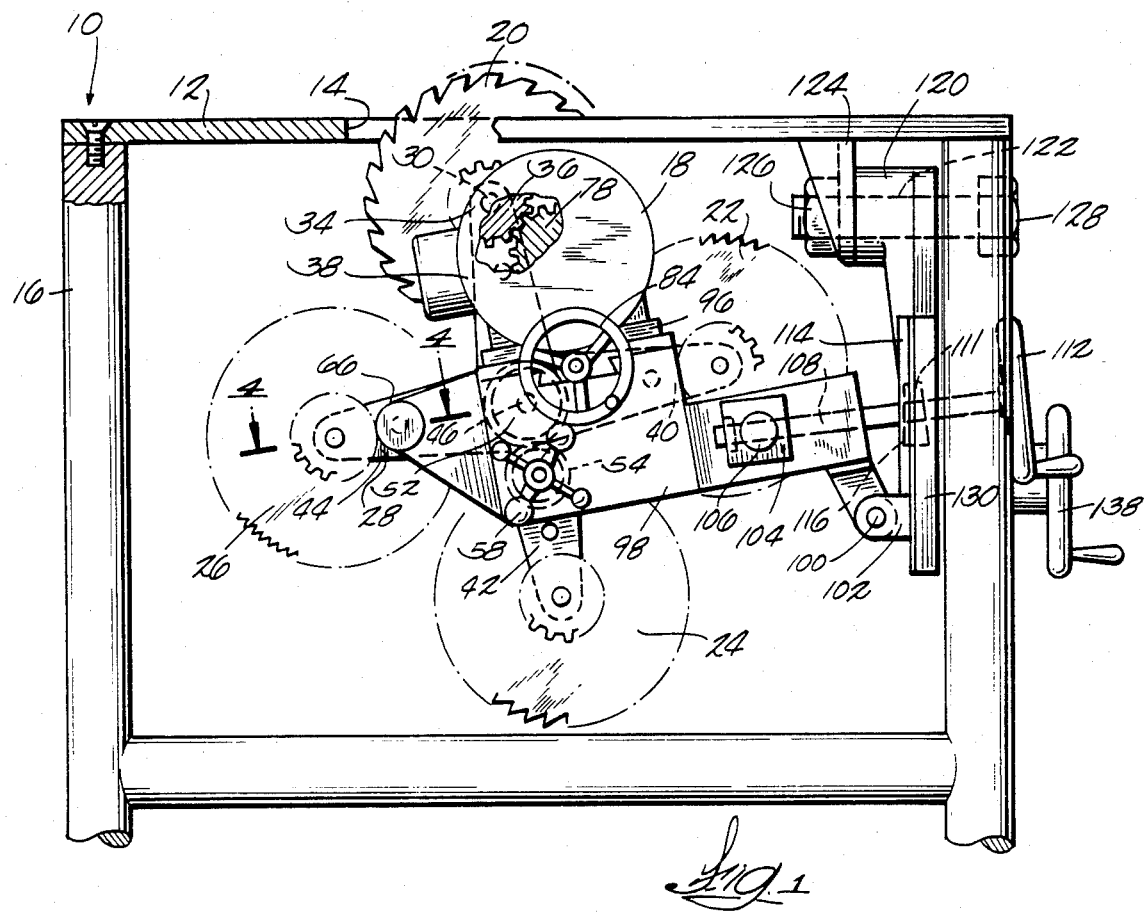
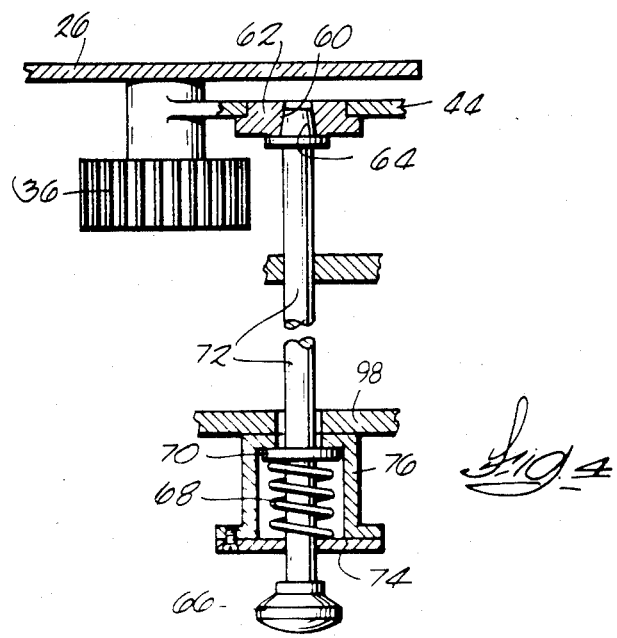

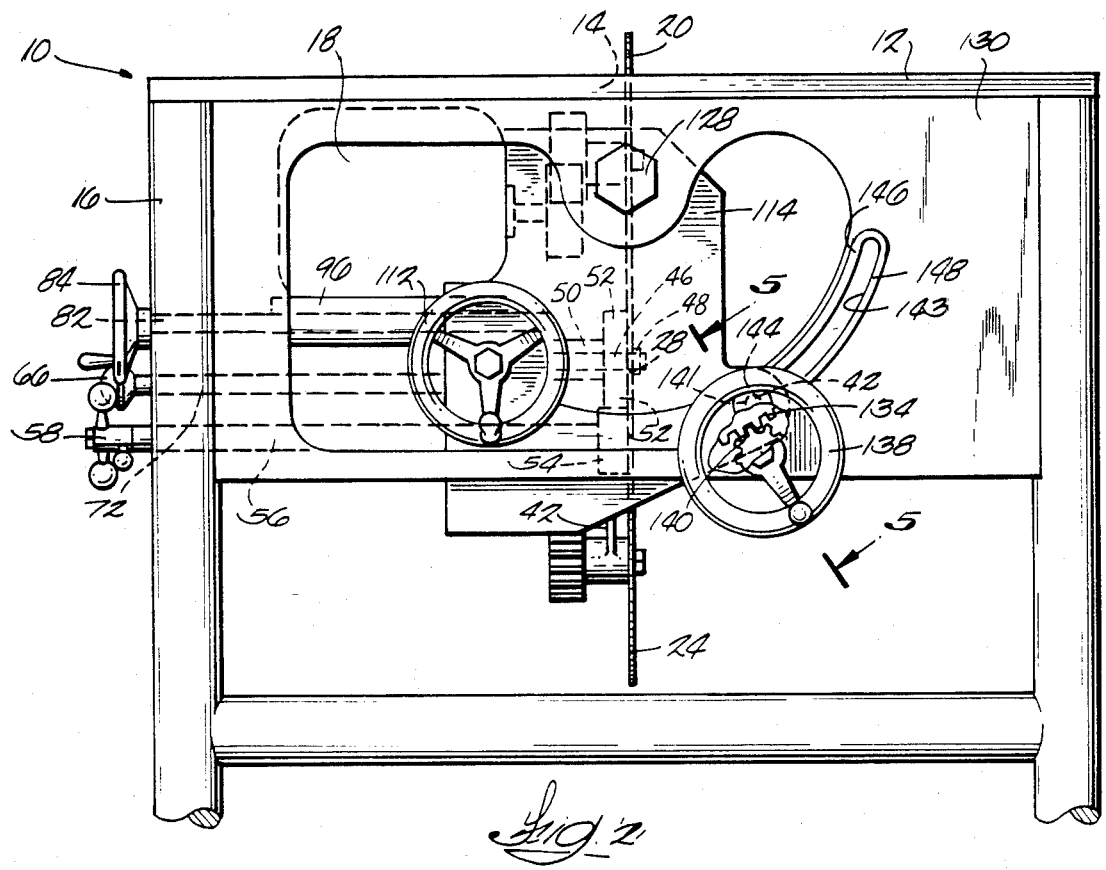
Fig. 2
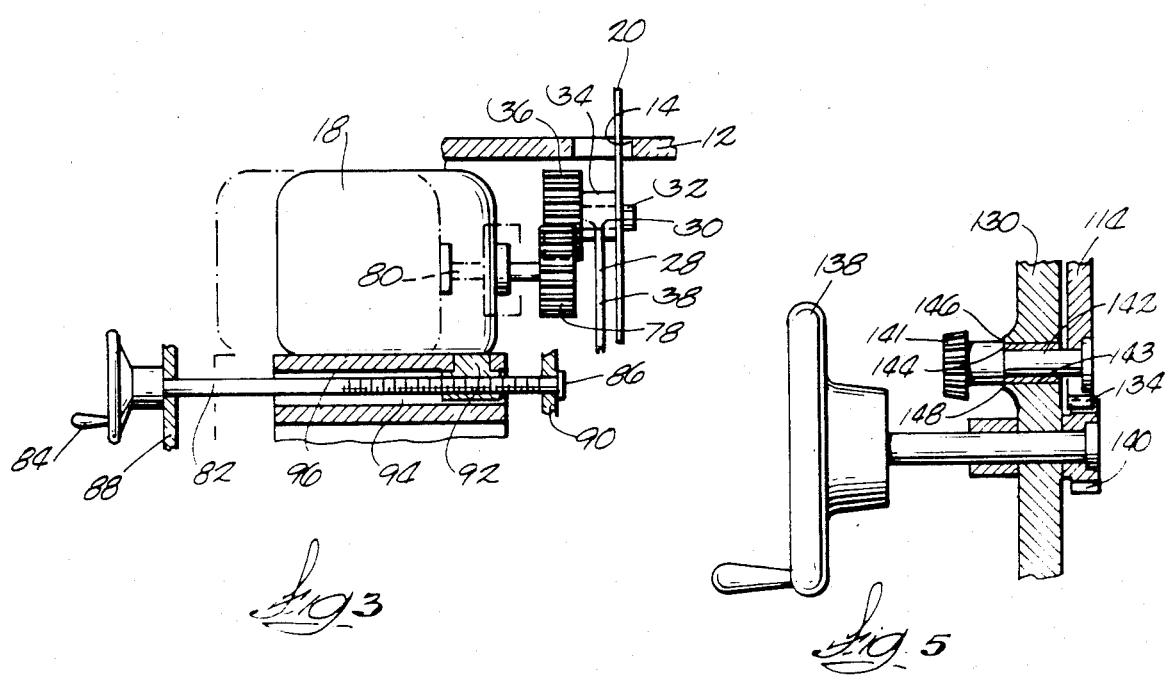
Fig. 3
Fig. 5

TABLE SAW WITH MULTIPLE BLADE TURRET

This application is a continuation of application Ser. No. 341,934, filed Jan. 22, 1982, and now abandoned.

TECHNICAL FIELD

The present invention relates to rotary power saws, particularly to such saws which have an indexable turret carrying plural saw wheels.

BACKGROUND ART

Table saws are well known machines for cutting and forming kerfs in wood and other materials. In such devices material is fed to a power driven saw wheel, or vice versa. Because the type of material being cut, its thickness, and other factors can vary, a wide variety of saw wheels having different characteristics are in use. One problem with such saws has been the need to change saw wheels when the type of material to be cut is changed. One prior solution has been to unbolt the saw wheel from its spindle, replacing it with a suitable saw wheel for the task at hand. Such a procedure is cumbersome, requires the use of hand tools, and can be particularly awkward for a table saw, in which the operator is required to work beneath the saw table to reach the hub of the saw wheel. This is not a satisfactory solution to the problem.

Others have tried to produce a saw in which blades can be changed without disconnecting a particular saw wheel. Some such saws have employed a rotatable turret beneath the saw table which can be indexed to present a particular blade through the slot of the table. But the prior art devices have disadvantages. In some such devices each saw wheel has its own motor, eliminating the need to disconnect and reconnect a motor each time a saw wheel is changed, but requiring as many motors as saw wheels, which adds considerably to the expense of the machine. Furthermore, since each motor must have power fed to it, either commutators must be provided or the dress of the line cord which feeds power to the components mounted on the turret limits the turret's freedom to turn.

Another solution to the problem has been to provide a table saw with a single drive which drives every saw wheel on the turret, including the ones not in use. Although such a device has only one motor and requires no clutches or the like, it has the disadvantage of being unsafe, since several saw wheels are moving at once.

Another disadvantage in some prior art multiple saw wheel designs is the inability to adjust blade height and inclination.

SUMMARY OF THE INVENTION

A first object of the invention is to provide a power saw having plural saw wheels each adapted to a particular task. A second object of the invention is to provide such a structure which requires no tools for changing saw wheels, and in which saw wheels can be changed easily and conveniently. A third object of the invention is to provide such a structure with a single source of motive power and the fewest possible duplications of structure. Another object of the invention is to provide a saw in which only the blade in use is driven. Still another object of the invention is to provide such a saw which also allows the usual adjustments of saw wheel height and tilt to allow a wide variety of kerfs and cuts to be made in a workpiece while achieving the other benefits of the present invention. Other objects of the invention will become apparent from the present description.

The essence of the invention is a power saw in which the single saw wheel of prior saws is replaced by a turret which carries plural saw wheels. Means are provided to rotate the turret to select a particular saw wheel for a given job. When a saw wheel has been selected, it is driven by engaging a motor with it; only one motor is required to provide the motive power for whatever saw wheel is selected. A new saw wheel can be selected by disengaging the motor from the previously selected saw wheel, rotating the turret to present a new saw wheel, and engaging the motor with the newly selected saw wheel. There is thus no need to disassemble any part of the saw to change the saw wheel.

In a preferred embodiment of the invention the assembly has a first subframe to which the turret is mounted, a second subframe to which the first subframe is pivotally mounted, and a frame for supporting the saw table, to which the second subframe is pivotally mounted. The first subframe can be pivoted with respect to the second to raise or lower the saw turret, and the second subframe can be pivoted with respect to the frame to tilt the turret out of its plane. Thus, the present rotary table saw can be equally as adjustable as prior art saws in which the saw wheel cannot be changed easily.

BRIEF DESCRIPTION OF DRAWINGS

FIG. 1 is a side elevational view of a preferred embodiment of the invention.

FIG. 2 is a front elevation of the structure shown in FIG. 1.

FIG. 3 is a fragmentary view similar to FIG. 2 but partly in cross section, showing how the motor is advanced or retracted to engage or disengage the drive for the selected saw wheel.

FIG. 4 is a view taken along line 4—4 of FIG. 1, showing means for releasably locking the turret in place.

FIG. 5 is a view taken along line 5—5 of FIG. 2, showing details of the means for tilting the saw wheels out of their plane.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. While the best known embodiment has been described, the details may be changed without departing from the invention, which is defined by the claims.

Referring now to the drawing figures, the table saw shown at 10 comprises a work support table 12 including a slot 14 through which a saw wheel is presented, a frame 16 for supporting table 12 and the other parts of the saw, a motor 18 for supplying motive power, and saw wheels such as 20, 22, 24, and 26 disposed circumferentially about a turret 28 which is ultimately supported by the frame. Of course, more or fewer saw wheels could be mounted to the turret as a matter of design choice.

Referring now to FIG. 3, each saw wheel such as 20 is concentrically mounted on a stub shaft 30 by a nut 32. Shaft 30 is rotatably carried in a bearing sleeve 34.

Arbor gear 36 is keyed to shaft 30; when gear 36 is rotated, wheel 20 will be driven. Bearing sleeve 34 is fastened to an arm such as 38 of the turret, which is cross-shaped to save weight. (For completeness, the other arms of turret 28 are denoted as 40, 42, and 44.) Rotation of turret 28 in its generally vertical plane causes a new saw wheel to be presented through slot 14 for sawing.

Referring now to FIG. 2, turret 28 is mounted on a stub shaft 46 and held in place by a nut 48. Stub shaft 46 is received rotatably in bearing sleeve 50. The other end of stub shaft 46 is keyed to spur gear 52. Referring briefly again to FIG. 1, spur gear 52 meshes with a second spur gear 54; the two gears are configured to provide whatever drive ratio is desired. Spur gear 54 is keyed to a shaft 56 (FIG. 2), which in turn is keyed to a handwheel 58 so that rotation of handwheel 58 rotates the turret. When a particular saw wheel has been selected by rotating the turret to a suitable position, an aperture 60 formed in an insert 62 secured to arm 44 of the turret is in registration with a spring loaded shot bolt 64, which is thrust inward by releasing handle 66, allowing spring 68 to urge collar 70 fixed to shaft 72 away from a plate 74 fixed to a stationary element 76 of frame 98 (see FIG. 4). Thus, to rotate the turret, handle 66 is pulled outward to release shot bolt 64, the turret is rotated so the shot bolt is in registration with another aperture (each arm has an aperture such as 60), and handle 66 is then released to lock the turret in place so it cannot move during sawing.

Referring again to FIG. 3, the transmission between motor 18 and arbor gear 36 and the means for coupling and uncoupling it can be described. When motor 18 is in the position shown in full lines, the spur gear 78 on its output shaft 80 meshes with arbor gear 36, permitting saw wheel 20 to be driven by the motor. When the motor 18 is retracted to the position shown in phantom in FIG. 3, gears 36 and 78 become disengaged and gear 78 and motor 18 are clear of the turret assembly to allow unconstricted rotation thereof. When another saw wheel is rotated into the position of saw wheel 20 in FIG. 3, the corresponding arbor gear is in position to engage spur gear 78, and engagement can be effected by returning motor 18 to its position shown in full lines. For displacing motor 18, either to advance to retract it, a worm 82 is provided having a handwheel 84 keyed to one end and a head 86 at the other end. The handwheel and head respectively bear against the outsides of frame members 88 and 90 which are secured to frame 16, thus permitting rotation but preventing thrust of worm 82. Slide 92 has a threaded bore, defines a nut carried on the threads of worm 82, and is carried in slot 94 and also secured to the base plate 96 to which motor 18 is secured. Thus rotation of handwheel 84 rotates worm 82, causing axial travel of slide 92 in slot 94 to advance or retract base plate 96, and thus motor 18, to the right or left in reference to FIG. 3. There is no need to provide means to secure the motor in place, since the high turn to travel ratio for worm 82 and the threaded bore in slide 92 is sufficient to prevent undue movement. In any event, a slight misalignment in the position of the motor is not important.

In the depicted embodiment of the invention means are provided for raising and lowering the level of the selected saw wheel and for tilting the saw wheel out of its plane. These adjustments are highly desirable, as they are needed for cutting dovetails, dadoes, rabbets, and other configurations which are frequently used to join various parts of an assembled workpiece.

The means for adjusting the height of the turret, and thus of the selected saw wheel in slot 14, is as follows. Turret 28 is in this embodiment pivotally mounted to a first subframe 98; the subframe also carries shaft 56 and handwheel 58, which are independent of the main frame. The first subframe could be mounted directly to the frame to provide raising and lowering, but in this embodiment it is attached by pivot 100 to a second subframe 102 in order to allow the saw wheel to be tilted too (as explained below). Between pivot 100 and stub shaft 48 the first subframe is a rigid assembly. A nut 104 has transversely extending opposed stub shafts such as 106 journaled in the first subframe. The inward or first end of shaft 108 is a worm threadably received in the bore of nut 104 and provided with a retainer nut 110 preventing the first subframe from being lowered excessively. Shaft 108 has a thrust bearing 111 to prevent axial inward travel with respect to second subframe 102, so that rotation of handwheel 112 keyed to shaft 108 tends to advance or retract nut 104 on shaft 108, thus pivoting first subframe 98 with respect to second subframe 102. Since such pivotal rotation of first subframe 98 changes the position of shaft 108 with respect to the plate 114 of second subframe 102, a vertically disposed slot 116 is provided to allow slight upward and downward travel of shaft 108 without permitting thrust bearing 111 to pass axially through plate 114. The rotatable carriage of nut 104 with respect to first subframe 98 is provided to allow slight rotation of nut 104 when the first subframe is raised or lowered.

To tilt the saw wheels out of their plane, the turret, first subframe 98, and second subframe 92 are tilted as a unit with respect to frame 16, as follows. The upper end of second subframe 102 defines a bearing sleeve 120 to receive a stub shaft 122 which is supported by a portion of frame 16 and by a lug 124 depending from the underside of table 12. The opposed nut 126 and head 128 secure shaft 122 in place. Stub shaft 122 has a central axis which is approximately in the plane of the saw wheels and preferably substantially intersects the axis of rotation of the selected saw wheel, so tilting of the second subframe about the stub shaft 122 tilts the blade without raising or lowering it very much, reducing the amount of adjustment necessary when an oblique cut is desired.

The mechanism for regulating the blade tilt is shown in FIGS. 1, 2, and 5. Plate 114 is a part of second subframe 102, while plate 130 is stationary, being mounted to the frame. Plate 114 has an arcuate rack 134 concentric with shaft 122. Handwheel 138 is keyed to a shaft which is keyed to a concentric spur gear 140; the shaft is mounted rotatably on frame 16. Rack 134 and spur gear 140 mesh, so rotation of the handwheel rotates second subframe 102 about stub shaft 122, tilting the turret and thus the saw wheel selected for a particular application. The tilt is maintained by tightening down lock nut 141 which is threaded to a shaft 142 fixed to plate 114 and extending through slot 143. Lock nut 141 has a friction surface 144 bearing against the surfaces 146 and 148 of plate 130 adjacent slot 143 to maintain a preset tilt of the saw wheel.

For convenience, the preferred embodiment of the invention is arranged so that handwheels 58 and 84 for changing the saw wheel are on one side of the assembly and the handwheels 112 and 138 for adjusting the height and tilt of the selected blade are on another side of the assembly. Although in the disclosed embodiment the drive means employs gears, other drive means including an axial coupling between the motor and saw blade could be employed.

I claim:

1. A rotary table saw having mountings for plural saw wheels, a single saw wheel drive, and means to choose a particular saw wheel, comprising:
   A. a work support table having a slot therein;
   B. a frame for supporting said work support table;
   C. a turret carried on a pivot supported by said frame and disposed for rotation in a substantially vertical plane, whereby to present a selected saw wheel at said table slot by rotating said turret;
   D. plural saw wheel arbor gears disposed circumferentially around said turret for being driven to rotate a corresponding saw wheel; and
   E. drive means having a first position for driving the arbor gears of the saw wheel presented at said table slot during operation of said saw and a second position for disengaging said arbor gears during rotation of said turret for selection of another saw wheel, said drive means comprising:
      i. a drive gear;
      ii. a motor having an output shaft for driving said drive gear; and
      iii. means to displace said motor and drive gear as a unit between said first position in which said drive gear meshes with the arbor gear of the saw wheel presented through said slot and said second position in which said drive gear is disengaged from said arbor gear, whereby only the saw wheel in use is driven during operation of the saw, and only one drive means is required for driving the selected saw wheel.

2. The rotarty table saw of claim 1, wherein said means to displace said motor and drive gear comprises a worm rotatably supported by said frame, a nut meshing with and disposed parallel to the axis of said worm and fixed to a slidable motor mounting which receives said motor, and means for rotating said worm for advancing or retracting said nut to slide said motor mounting.

3. The rotary table saw of claim 1, further comprising means to raise and lower said turret with respect to said work support table for raising and lowering the saw wheel selected for sawing.

4. The rotary table saw of claim 3, wherein said turret is pivotally mounted on a first subframe, which in turn is pivotally supported with respect to said frame, permitting partial rotation of said first subframe in a vertical plane parallel to the plane of the saw wheels for raising and lowering said first subframe with respect to said frame.

5. The rotary table saw of claim 1, having means for tilting the saw blade presented through said slot out of its plane, comprising:
   A. a horizontally disposed pivot pin substantially in the plane of said saw wheels, supported on said frame, and rotatably supporting a second subframe;
   B. means for rotating said second subframe about said pivot for tilting said turret out of its plane; and
   C. means for locking said second subframe with respect to said frame.

6. The rotary saw of claim 5, wherein said means for rotating said second subframe comprises:
   A. an arcuate rack disposed along the circumference of a circle centered on said pivot and secured to said second subframe;
   B. a spur gear disposed to mesh with said rack and pivotally supported by said frame; and
   C. means to rotate said spur gear; whereby to drive said rack circumferentially about said pivot.

7. The rotary saw of claim 5, wherein said means for locking said second subframe comprises an arcuate slot in a plate supported by said frame and disposed along a circle centered on said pivot; a lock nut having a threaded bore registered with said slot; and a shaft having a first threaded end received in said bore and secured at its second end to said second subframe, whereby said lock nut bears against said plate adjacent said slot when said lock nut is threaded onto said shaft.

8. The rotary saw of claim 1, further comprising:
   A. a first subframe for supporting said turret pivot;
   B. a second subframe to which said first subframe is pivotally attached for rotation of said first subframe about an axis perpendicular to the plane of said turret, whereby to raise and lower said first subframe; wherein said second subframe is pivotally supported on said frame for rotation about an axis parallel to the plane of said turret, whereby to tilt said first and second subframes with respect to said frame.

* * * * *